United States Patent [19]

Fukushima et al.

[11] 3,836,096

[45] Sept. 17, 1974

[54] TAPE REEL AND TAPE REEL STORING MAGAZINE

[75] Inventors: Juichi Fukushima, Osaka; Michinori Nagahiro, Nishinomiya, both of Japan

[73] Assignee: Matsushita Electric Industrial Co., Ltd., Kadoma-shi, Osaka, Japan

[22] Filed: Dec. 1, 1972

[21] Appl. No.: 311,425

[30] Foreign Application Priority Data

| | | |
|---|---|---|
| Dec. 1, 1971 | Japan | 46-113381 |
| Dec. 1, 1971 | Japan | 46-113384 |
| Dec. 1, 1971 | Japan | 46-113397 |
| Dec. 1, 1971 | Japan | 46-113398 |
| Dec. 1, 1971 | Japan | 46-113400 |
| Dec. 21, 1971 | Japan | 46-121247 |
| Jan. 14, 1972 | Japan | 47-7464 |

[52] U.S. Cl. .................... 242/197, 360/132

[51] Int. Cl.... G03b 1/04, G11b 15/32, G11b 23/04

[58] Field of Search .................... 242/197–200, 242/195, 55.19; 274/4 B, 4 C, 11 B, 11 C; 352/72, 78

[56] References Cited

UNITED STATES PATENTS

| | | | |
|---|---|---|---|
| 3,197,150 | 7/1965 | Camras | 242/195 |
| 3,598,926 | 8/1971 | Umeda | 179/100.2 Z |
| 3,677,495 | 7/1972 | Villers et al. | 242/197 |

*Primary Examiner*—Leonard D. Christian
*Attorney, Agent, or Firm*—E. Manning Giles

[57] ABSTRACT

A reel for video tape where the tape has a wider protective leader strip at the outer end, and a magazine in which such a reel may be housed. The reel has flanges with offset peripheral shoulders around which the leader strip is wrapped. In order to hold the leader strip in place on the shoulders, either or both of the flanges have a plurality of integral, resilient, thin-gauge fingers projecting outwardly between pairs of radial slits, each finger having a claw at the outer end. The magazine has an aperture through which the tape and leader strip may pass and an opening through which a drive connection can engage the reel. The magazine contains a pusher which bears yieldably against the leader strip, but not the tape, to seat the strip during winding against the offset shoulders on the flange peripheries, causing the edge of the strip to be held by the fingers. The magazine also contains an interceptor in the unwinding path of the leader strip to disengage it from the reel and guide it out the aperture during unwinding.

12 Claims, 16 Drawing Figures

TAPE REEL AND TAPE REEL STORING MAGAZINE

BACKGROUND OF THE INVENTION

This invention relates to a reel for winding a tape-like recording medium and a tape magazine for storing the reel therein, adapted for use with a recording and reproducing apparatus so constructed that the recording medium wound on the reel is automatically placed in a recording and reproducing path when said reel or tape magazine is mounted in the apparatus, and more particularly, to improvements in the reel for winding a tape-like recording medium having a leader tape wider in width than said recording medium and in the tape magazine containing one of such reel, which are so designed that when mounted in a recording and reproducing apparatus, the tape is automatically threaded in the apparatus by being withdrawn from the reel by a leader tape connected to the leading end thereof.

In a tape magazine of the type described having one reel therein, it has been considered, as a method of keeping the tape in its wound state and transmitting a driving force to the tape when said tape is to be unwound, to hold a leader tape provided at the leading end of the tape, at the peripheral edge portions of the reel flanges by holding means provided at said portions. In this case, the holding means must be constructed so that its tape holding force meets predetermined conditions. However, according to the constructions of conventional tape holding means, the holding force has generally been too strong, tending for the leader tape to be damaged when said leader tape is engaged by or disengaged from the holding means.

Further, conventional tape magazines of the type described above are, in most cases, used with a reel disposed therein. Therefore, these tape magazines, particularly large-sized tape magazines for use with magnetic video recording and reproducing apparatus, require some improvements, such as the provision of position regulating means which will regulate to some extent the position of the reel in the magazine case when the reel is not in use but set the reel free when the reel is in use.

It is also desirable to construct the magazine such that it may be readily used with an apparatus of not an autothreading type, that is, the so-called open reel type apparatus, or with an apparatus which is capable of autothreading but uses a magazine not having a case.

Therefore, a first object of the present invention is to provide a tape reel for use in a one-reel type tape magazine, which is provided with leader tape holding means which will not impose an undesirable load on a leader tape.

A second object of the invention is to provide a tape reel of the character described, in which the leader tape holding means is not susceptible to damage.

A third object of the invention is to provide a one-reel type tape magazine having a case, which is provided with means which will prevent effectively an unnecessary displacement of a reel within the case.

A fourth object of the invention is to provide a tape magazine of the character described above, which is provided with brake means for preventing an unnecessary rotation of the reel within the case, which has been improved such that the braking force may conveniently be relieved.

A fifth object of the invention is to provide a tape magazine of the character described above, in which said brake means is so constructed as not to have detrimental effects on the free end of a leader tape provided at the leading end of the tape.

A sixth object of the invention is to provide a tape magazine of the character described above, which is so constructed that the reel may be easily removed from or mounted in the case.

According to one aspect of the invention, there is provided a tape reel for winding a tape-like recording medium and a leader tape substantially wider in width than said recording medium connected to one end of said recording medium, said tape reel having a hub and substantially circular upper and lower flanges fixed to the opposite ends of said hub in substantially parallel and opposed relationship with each other, said upper and lower flanges respectively have central portions surrounding said hub which define a circular recording medium receiving space of a width larger than the width of said recording medium but smaller than the width of said leader tape, and peripheral edge portions which define peripherally of said recording medium receiving space an annular leader tape receiving space of a width at least substantially equal to the width of said leader tape, and at least one of said upper and lower flanges is formed therein with a plurality of pairs of slits extending substantially radially inwardly from the peripheral edge thereof, and spaced from each other to form between each pair of said slits and integrally with the flange a leader tape holding strip which is smaller in thickness than the other portion of the flange and provided at its outer free end with a claw projecting toward the opposite flange for holding the leader tape in said leader tape receiving space.

According to another aspect of the invention, there is provided a tape magazine for storing therein the tape reel of the type defined above in such a manner that the leader tape and the tape-like recording medium, wound in said tape reel, may be paid out from or rewound in said reel, characterized in that said tape magazine comprises a case defining therein a space for storing said tape reel, and having an opening for passing said leader tape and recording medium therethrough into and out of said case, and an opening for connecting said tape reel in said case with a drive source therethrough; means provided in said case for engaging said leader tape to disengage the leader tape from said leader tape holding strips and guiding it toward said tape passage opening when said tape reel rotates in a tape unwinding direction; leader tape pusher means provided in said case for automatically forcing said leader tape into said leader gap receiving space when the tape is rewound; relievable brake means provided in said case to prevent said tape reel from unnecessarily rotating in a tape unwinding direction; and means consisting of two cooperating members respectively provided between said tape reel and the inner wall of said case for regulating the position of the reel in said case by virtue of engagement of both members.

These and other objects and features of the present invention will become apparent from the following detailed description of embodiments taken in conjunction with the accompanying drawings. In the drawings.

Figure 1:
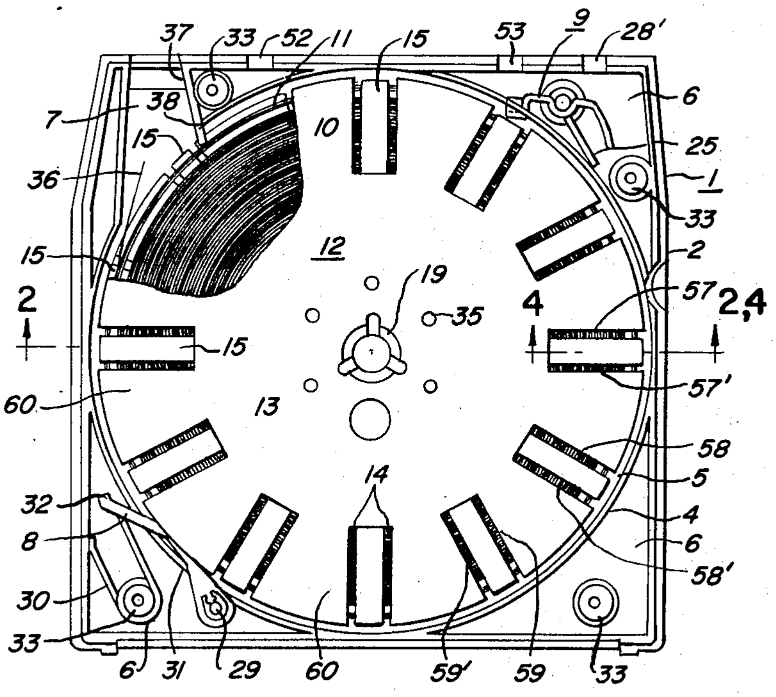
FIG. 1 is a plan view of an embodiment of the tape magazine according to the present invention, as viewed in an inverted position with a lower case member removed.
Figure 2:
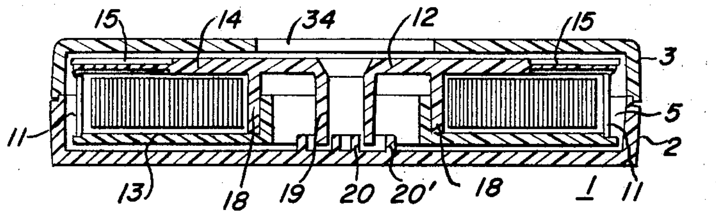
FIG. 2 is a sectional view of the embodiment shown in FIG. 1.

With reference to the drawings, a case 1 of a tape magazine is composed of an upper case member 2 and a lower case member 3, as shown in FIG. 2. As may be apparent from FIG. 3, the upper and lower case members 2, 3 each are substantially in the shape of a box and define a cylindrical cavity 5 defined by a circular partition wall 4 and substantially triangular cavities 6 at the four corners thereof. At one corner is formed a tape passage opening 7 communicating the cylindrical cavity 5 with the exterior of the case 1. In one of the two substantially triangular cavities 6 is provided a leader tape pusher member 8, while in the other one thereof is provided a brake member 9. As may be apparent from FIGS. 1 and 2, a reel 12 having a magnetic tape 10 and a leader tape 11 wound thereon is stored in the cylindrical cavity 5.

Figure 4:
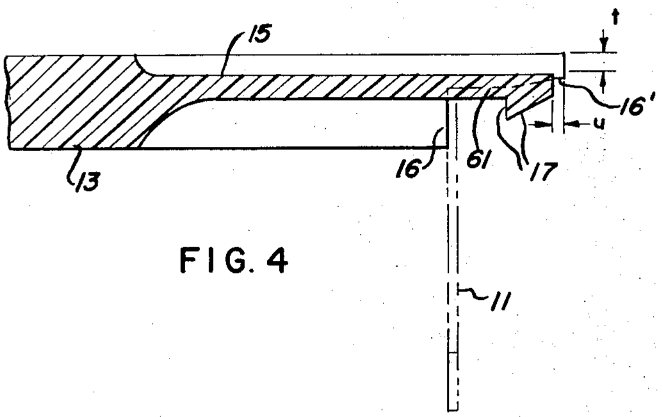
FIG. 4 is a view showing, in an enlarged scale, the section taken along the line 4—4 of FIG. 1.

The reel 12 has a hub 18 and substantially circular upper and lower flanges 13, 14 fixed to the opposite ends of said hub 18. Each of the flanges 13, 14 is formed therein with a plurality of pairs of slits or radial cutouts 57, 57′; 58, 58′; 59, 59′; ........ extending substantially radially inwardly from the peripheral edge thereof. These pairs of slits are formed circumferentially of the flange and define a plurality of leader tape holding strips integral with and extending radially of said flange. FIG. 4 shows the cross section of this portion of the flange. As seen in FIG. 4, the portion of the flange other than the leader tape holding strip 15 forms a shoulder 16 at a location adjacent the outer peripheral edge thereof and the leader tape holding strip 15 has a thickness smaller than the thickness of the other portion of the flange, so that the central portions of the respective upper and lower flanges, radially inwardly of the slitted peripheral edge portion may define a space of a width larger than the width of the magnetic tape 10 but smaller than the width of the leader tape 11 provided at the leading end of said magnetic tape, and the slitted peripheral edge portions thereof may define a space of a width larger than the width of said leader tape. Therefore, the magnetic tape 10 is wound in the central portion of the reel 12 but the leader tape 11 is engaged by the shoulders 16 of the respective flanges and retained by claws 17 provided at the outer free ends of the respective leader tape holding strips 15.

Since the leader tape holding strip 15 is smaller in thickness than the other portion of the flange as stated above, it is highly flexible and easily deflects outwardly when the leader tape 11 is released therefrom. Therefore, the force applied to the leader tape 11 is slight and the chance for the leader tape 11 to be damaged is slim. The outer surface of the leader tape holding strip 15 is recessed by a distance t from the outer surface of the other portion of the flange axially inwardly of the reel. This is for the purpose of protecting the leader tape holding strip 15 against damage otherwise caused by external forces, such as a deflecting force, applied thereto, and is advantageous in ensuring safe transfer of the reel 12 from the case 1, for example, to a conventional open-reel type magnetic recording and reproducing apparatus when it is desired to use the reel on such apparatus.

Further, the outer end of the leader tape holding strip 15 is radially inwardly recessed from the other portion of the peripheral edge of the flange by a distance u. This is for the purpose of protecting the leader tape holding strip against damage, similar to the case of the outer surface of said leader tape holding strip being recessed by the distance t as described above, and also for the purpose of forming concaves and convexes along the peripheral edge of the flange, to facilitate engagement of the reel by the aforesaid brake member 9.

It is to be understood that the leader tape holding strips 15 may be formed in only one of the upper and lower flanges, to achieve the intended effect.

The adjacent leader tape holding strips are circumferentially spaced from each other by a distance about three times the width of said strips and the leader tape holding strips formed in one of the upper and lower flanges are not axially aligned with those formed in the other flange but are located each between the adjacent strips formed in the other flange as shown in FIG. 1. In the embodiment shown in FIG. 5, however, the leader tape holding strips are formed in the upper and lower flanges in alignment with each other in the axial direction of the reel.

Figure 5:
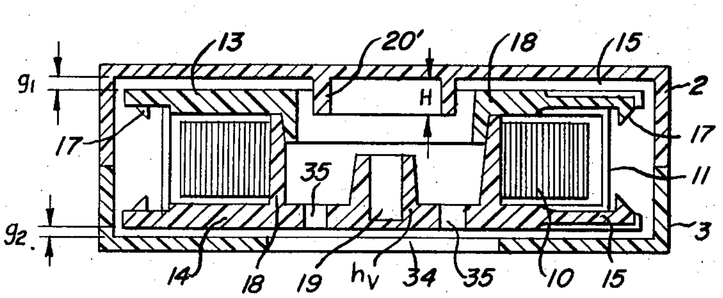
FIG. 5 is a sectional view of another embodiment in which the embodiment shown in FIG. 1 is partially modified.

With the construction shown in FIG. 1, only one holding strip is required to be deflected at a time during engagement or disengagement of the leader tape with or from the reel, and accordingly the engagement or disengagement of the leader tape with or from the reel is facilitated as compared with the construction shown in FIG. 5, in which two holding strips are required to be deflected at a time.

In the construction of each embodiment described above, the flange has a plurality of intermediate portions 60 formed between the leading tape holding strips 15 and the position of the leader tape disengaged from the holding strips is regulated by said intermediate portions 60, providing for smooth passage of the leader tape through the tape passage opening 7.

Further, the inner surface of the leader tape holding strip 15 is located slightly axially inwardly from the inner surface 61 of the shoulder 60 formed in the intermediate portion 60, as shown in FIG. 4, so that the leader tape 11 may be held with a compressive force applied from both sides thereof.

By the friction created by this compressive force, a flange driving force is transmitted to the leader tape 11 when said leader tape is to be unreeled, and is utilized as a force to unreel said tape.

As shown in FIG. 4, the insides of the outer peripheral edge of the shoulder and the claw 17 of the leader tape holding strip 15 are forced with inclined surfaces 16', 17' respectively which incline in a direction in which the interval between the upper and lower flanges expands outwardly toward the peripheral edges of said flanges, so as to facilitate insertion of the leader tape into the space between the upper and lower flanges.

The hub 18 of the reel 12 has an axial hollow therein and a hollow boss 19 is formed in the center of said axial hollow.

When the magazine is mounted in the magnetic recording and reproducing apparatus, this boss 19 determines the position of the reel 12 by engagement with a reel shaft provided on the apparatus, and further, a cylindrical positioning projection 20 provided on the inner surface of the upper case member 2 is loosely received in said boss 19 to enable said reel 12 to rotate freely about said cylindrical positioning projection.

The cylindrical positioning projection 20 serves to prevent the reel 12 from shifting within the case 1 when the magazine is not mounted in the recording and reproducing apparatus. An annular projection 20' provided on the inner surface of the upper case 2 also serves to regulate the reel position, the function of which will be described with reference to FIG. 5.

The height H of the projection 20' is made smaller than the total clearance between the inner surface of the case and the reel, i.e., the clearance $g_1$ between the inner surface of the case and the reel flange 13 plus the clearance $g_2$ between the inner surface of the case and the reel flange 14, as shown in FIG. 5. Therefore, if the reel 12 is placed in the case 1 in an inverted position with respect to the position shown in FIG. 5, the upper and lower case members 2, 3 cannot be put together in mating engagement with each other, and thus casual mounting of the reel 12 in an inverted position can be avoided. When the magazine is mounted in the recording and reproducing apparatus, the case 1 and the reel 12 are correctly positioned by a positioning mechanism provided in said apparatus and a slight clearance is maintained between the reel 12 and the projection 20' or other portion of the inner surface of the case 1, so that in no case will both of them be held in contact with each other. This is also the case with the construction shown in FIG. 2.

Figure 6:
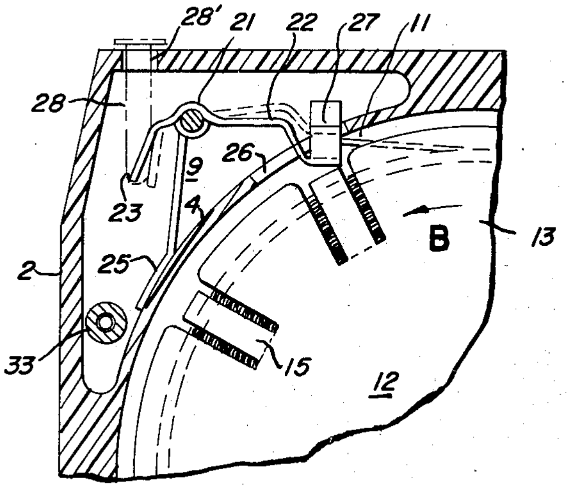
FIG. 6 is a fragmentary plan view, partially in section, showing in an enlarged scale the portion near the brake member of the embodiment shown in FIG. 1.
Figure 7:
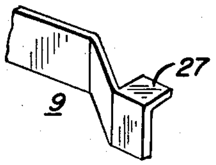
FIG. 7 is a fragmentary perspective view showing, in an enlarged scale, a portion of the brake member of the embodiment shown in FIG. 1.

The brake member 9 will be described in detail hereunder. As shown in FIG. 6, the brake member 9 consists of a strip having a boss 21, an engaging arm 22 and a brake relieving arm 23 extending from both sides of said boss 21. This strip is pivotally mounted at the boss 21 on a pivot pin 24 provided on the upper case member 2 and urged by a spring 25 to rotate in a clockwise direction as viewed in FIG. 6. Therefore, when the magazine is not in use, the end of the engaging arm 22 is projecting into the cylindrical cavity 5 of the case 1 through an opening 26 formed in the partition wall 4 of said case and held in engagement with the peripheral edge of one flange of the reel 1. In this case, the line connecting the end of the engaging arm 22 with the boss 21 is inclined such that, when the reel is rotated in the direction of the arrow B which is the tape unreeling direction, the end of said engaging arm 22 will penetrate into the reel, as may be apparent from FIG. 6. Therefore, the reel 1 is prevented from rotating in the tape unreeling direction but is rotatable in the opposite direction when the magazine is not in use. The engaging arm 22 may be engaged at its end with the peripheral edges of both the upper and lower flanges. The end of the engaging arm 22 is provided with a leader tape protecting lug 27 as shown in FIG. 7. In the engaging position of the brake member 9, the leader tape protecting lug 27 extends parallel to the reel flange 13 across the clearance between the reel 12 and the partition wall 4 of the case 1 as indicated by the solid line in FIG. 6. Therefore, in no case will the leading end of the leader tape 11 be allowed to get into the gap between the partition wall 4 and the end of engaging arm 22 by being blocked by the leader tape protecting lug 27.

When the magazine is mounted in the magnetic recording and reproducing apparatus, a brake relieving pin 28 provided in the apparatus moves into the magazine through an opening 28' formed in said magazine and causes the brake member 9 to make a pivotal movement against the biasing force of the spring 25, with the result that said brake member 9 is shifted to a position indicated by the alternate long and short dash line in FIG. 6 and the engaging arm thereof is thus disengaged from the reel flange 13, relieving the braking force being applied to the reel 12. It is the brake relieving arm 23 of the brake member 9 which receives the force of the brake relieving pin 28 in this case. The brake relieving arm 23, when the magazine is not in use, extends into the path of the brake relieving pin 28 at a small angle thereto as indicated by the solid line in FIG. 6. Therefore, it will be understood that when the brake relieving pin 28 moves into the magazine, the brake relieving arm 23 is urged out of the moving path of the pin 28 by said pin and as a result, the entire brake member 9 is pivoted in a counterclockwise direction as viewed in FIG. 6. Thus, the braking force is relieved. In FIG. 6, the brake relieving pin 28 is shown as being at the end of its inward stroke. In this position, the brake relieving arm 23 of the brake member 9 is in contact only with the side surface of the brake relieving pin 28. Therefore, the brake relieving pin 28 does not undergo a force in the axial direction thereof under the influence of the spring 25 and is held steadily in its position, with no fear of being moved off the magazine.

On the other hand, the leader tape pusher member 8 provided at a corner of the case 1 as stated previously, consists of a strip having a depression at the center thereof. This pusher member 8 is pivotally mounted at one end on a pivot pin 29 provided on the case 1 and urged inwardly of the case by a spring 30, with the bulged inside of its depression projecting into the space between the upper and lower flanges of the reel 12 through a cutout 31 formed in the partition wall 4. The other end of the leader tape pusher member 8 is bent slightly to constitute a position regulating lug 32 which will limit the displacement of said pusher member 8 toward the reel 12 under the biasing force of the spring 30, by engagement with the partition wall 4. This leader tape pusher member 8 serves to push the leader tape 11 inwardly of the reel 12 and force it into between the leader tape holding strips 15 of the upper and lower flanges during the tape winding operation.

Figure 3:
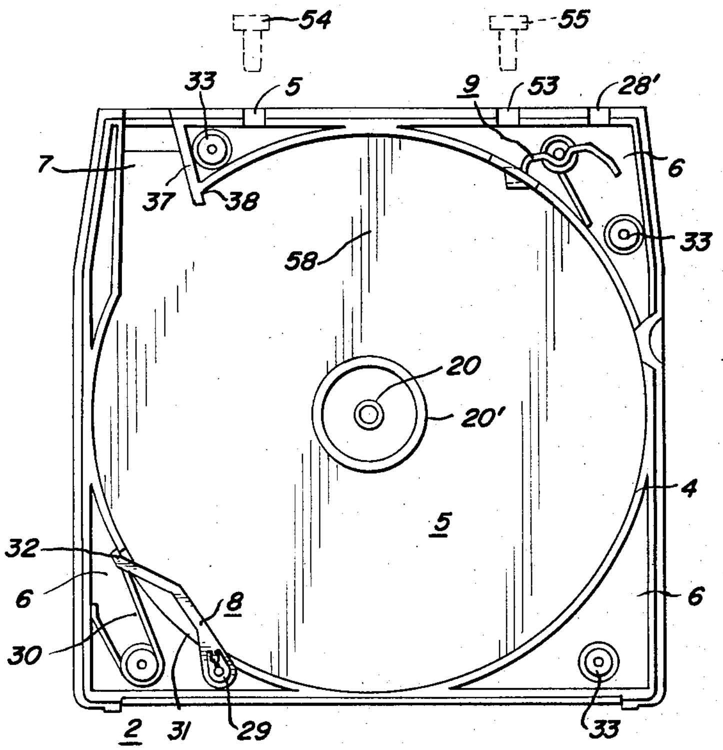
FIG. 3 is a plan view of the tape magazine, with the reel removed from FIG. 1.
Figure 8:
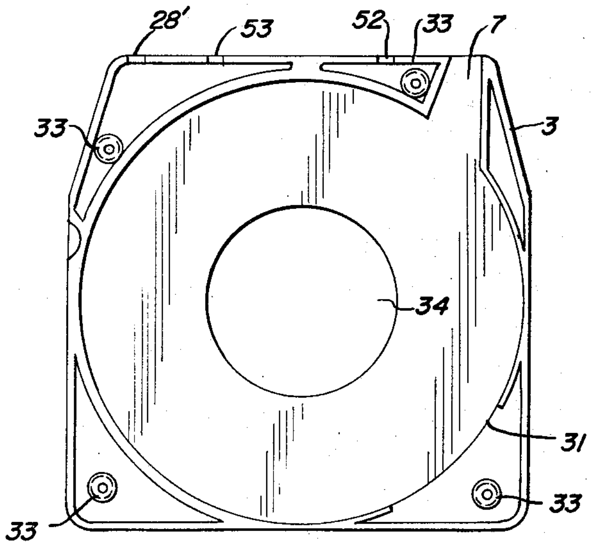
FIG. 8 is a plan view of the lower case member of the embodiment shown in FIG. 1.

The above described brake member 9, the leader tape pusher member 8 and the springs 25, 30 for urging said members are mounted on the upper case member 2 as shown in FIG. 3. The reel 12 having the tape wound therein is set in the upper case member 2 as shown in FIG. 1 and then the lower case member 3 shown in FIG. 8 is put over said upper case member 2 and secured thereto by means of screws screwed into bosses 33 provided on said upper and lower case members. By providing all of the elements, need to be provided in the case 1, on only one case member as stated above, demounting or mounting of the reel from or in the case is greatly facilitated.

Figures 9, 10, 11:
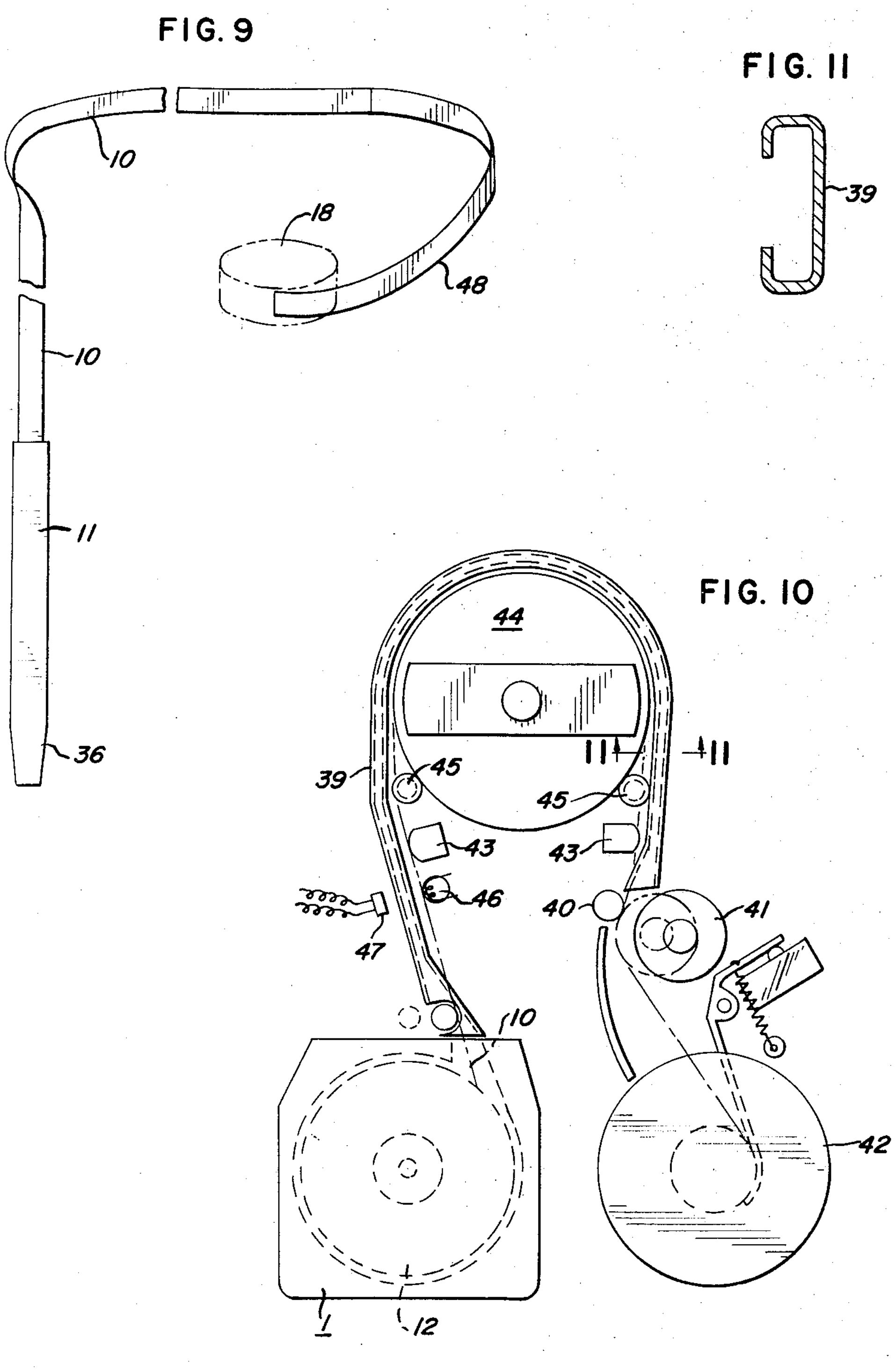
FIG. 9 is a perspective view illustrating a magnetic tape and a leader tape being connected with each other, which are used in the present invention.
FIG. 10 is a plan view showing briefly the construction of a recording and reproducing apparatus which is operable with the tape magazine shown in FIG. 1.
FIG. 11 is a sectional view of the leader tape guide taken along the line 11—11 of FIG. 10.

The lower case member 3 is formed with an opening 34. When the magazine is mounted in the magnetic recording and reproducing apparatus, a reel mount of the apparatus extends through the opening 34 and engages the boss 19 and driving holes 35 of the reel 12 for transmitting a torque from said reel mount to said reel. At the time of autothreading, the reel 12 rotates in a clockwise direction as viewed in FIG. 1. The end portion 36 of the leader tape 11 is slightly reduced in width as shown in FIG. 9 and therefore, projecting outwardly of the reel 12 without being retained by the leader tape holding strips 15, as shown in FIG. 1, as the reel 12 rotates for autothreading, the end 36 of the leader tape 11 abuts against one side wall 37 of the tape passage opening 7. The wall 37 extends slightly inwardly of the magazine and has a tape disengaging lug 38 which ensures positive abutment of the leader tape end 36 against the wall 37 even when the outwardly projecting length of the leader tape is short. The leader tape 11 is forced forward incident to rotation of the reel 12, with its end 26 in abutment against the wall 37, so that it is disengaged from the leader tape holding strips 15 and moved out of the magazine from the tape passage opening 7.

FIG. 10 shows briefly the construction of the magnetic recording and reproducing apparatus operable with the above-described magazine. The leader tape 11 unwound from the magazine case 1 passes in a leader tape guide 39 and through the nip between a capstan 40 and a pinch roller 41, and is taken up on a winding reel 42. The leader tape guide 39 is of a cross sectional shape as shown in FIG. 11. The magnetic tape 10 successive to the leader tape, because of its narrow width, moves off the leader tape guide 39 and is engaged around stationary heads 43, 43, a rotary head assembly 44 and a guide post 45 to be recorded or reproduced in a known manner. A lamp 46 and a photosensor 47 are provided for cooperatively sensing a sensing tape 48 which is connected to the terminal end of the magnetic tape 10 as shown in FIG. 9, and thereby stopping forwarding of tape.

The sensing tape 48 is not fixed to the hub 18 but disengageably wound around said hub, for the following reason. In an ordinary magazine having a case, the terminal end of a tape is fixed to a reel contained in said magazine, but in the present invention, the reel can be removed from the case 1 and, therefore, can be used with open-reel type apparatus. Most of open-reel type apparatus are not provided with tape end sensing means. Therefore, if the tape is fixed to the reel, the tape driving force would continuously be applied to the tape even after the tape has been exhausted, possibly causing a damage to the tape. According to the magazine of the invention, such undesirable phenomenon can be avoided and the reel in the magazine can be used with open-reel type apparatus, etc. without any trouble.

For avoiding insertion of the magazine in a reversed posibion into the apparatus and avoiding inadvertent erasing of the tape, the magazine is provided with through-holes 52, 53 as shown in FIGS. 1 and 3. These through-holes 52, 53 are provided in the same side wall of the magazine in which the tape passage opening 7 and the brake relieving pin insertion opening 28' are provided, at positions spaced from the center line 56 of the magazine by different distances respectively.

Namely, by providing a pin 54 in the recording and reproducing apparatus in such a manner and at such a location that it will be received in the reverse insertion preventing hole 52 only when the magazine is inserted in its regular position, the magazine when inserted in a reverse position will be blocked by the pin 54 abutting against the forward wall of said magazine and thus the reverse insertion of the magazine is avoided.

Further, by providing in the recording and reproducing apparatus an axially movable pin 55 at a location corresponding to the inadvertent erasing preventing hole 53 and by closing said hole 53 as required before insertion of the magazine into the apparatus, the closed or open state of the hole 53 can be controlled by said pin so as to avoid inadvertent erasing of the magnetic tape.

Now, the structure of the junction between the magnetic tape 10 which has sufficient flexibility and the leader tape 11 which is larger in width than the magnetic tape 10 and has a suitable regidity, will be described.

If the rigid leader tape and the flexible magnetic tape are simply bonded together, stress concentration tends to occur at the bonded portion of the narrower magnetic tape, resulting in breakage of the tape after repeated use.

Further, when the narrower magnetic tape moves off the leader tape guide 39, shown in FIG. 11, through the opening of said guide, the leading end of the magnetic tape abuts against the edges of said slit opening and undergoes a strong cutting force.

Figure 12:
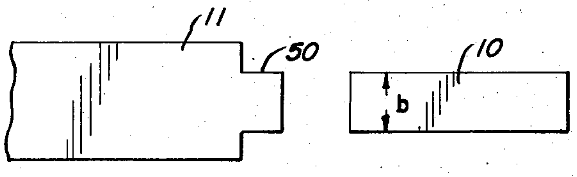
FIG. 12 is a plan view showing the leader tape and magnetic tape, used in the invention before they are connected with each other.
Figure 13:
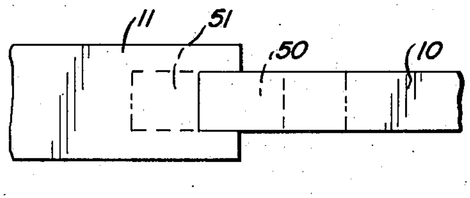
FIG. 13 is a plan view of the leader tape and magnetic tape after they are connected with each other.
Figure 14:
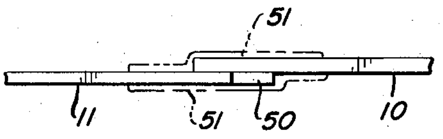
FIG. 14 is a side view of the leader tape and magnetic tape after they are connected with each other.

FIGS. 12–14 show a structure of junction which overcomes such disadvantages. Namely, as shown in FIG. 12, a projection 50 of the substantially same width *b* of the magnetic tape 10 is formed at the center of the trailing end of the leader tape at which said leader tape is to be bonded to the magnetic tape, and the magnetic tape 10 is superimposed on said projection 50 as shown in FIG. 13 and bonded thereto by means of bonding tapes 51 indicated by the alternate long and short dash line. The bonding tapes 51 are bonded on both sides of the junction between the magnetic and leader tapes 10, 11 as shown in FIG. 14.

Figure 15:
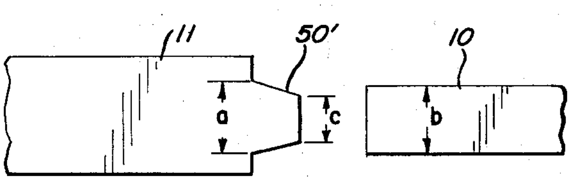
FIG. 15 is another type of leader tape and the magnetic tape before they are connected with each other.
Figure 16:
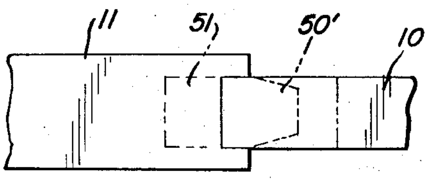
FIG. 16 is a plan view of the leader tape and magnetic tape, shown in FIG. 15, after they are connected with each other.

Another form of junction is shown in FIG. 15. In this form, a converged trapezoidal projection 50' is formed at the end to be bonded of the leader tape 11, the width *a* of the lower base of said trapezoidal projection being substantially equal to the width *b* of the magnetic tape 10 and the width *c* of the upper base thereof being smaller than said width *b*. The magnetic tape 10 is superimposed on the projection 50' of the magnetic tape in the manner shown in FIG. 16 and bonded to the leader tape in the same manner as described above.

According to such structures of junction as described above, since the magnetic tape 10 is bonded with the leader tape 11 at the projection 50 or 50' of the latter, the narrower projection 50 or 50' becomes more flexible than the other wider portion of the leader tape and hence the stress concentration at the side edges of the magnetic tape can be alleviated by said projection. The abutment of the magnetic tape side edges against the edges of the opening of the leader tape guide 39 can also be avoided when the leader tape moves off said guide 39.

What is claimed is:

1. In a tape reel of the type comprising a hub with a pair of substantially circular, axially spaced apart flanges thereon between which a length of recording tape is adapted to be wound, wherein each of said flanges is provided with a peripheral, axially outwardly offset shoulder portion upon which marginal portions of a leader strip of greater width than said tape and attached to the outer end thereof may be wound, the improvement wherein at least one of said flanges is of sufficient thickness to be relatively inflexible and is provided with circumferentially spaced apart pairs of substantially radial slits, each pair of slits defining a radially outwardly extending finger interposed therebetween and provided at its outer end with an axially inwardly extending claw, each of said fingers being integral with said flange and of such reduced axial thickness in relation thereto throughout most of its length as to be relatively flexible, each of said fingers being offset axially outwardly with respect to the inner surface of said flange a distance exceeding the distance said claw extends axially inwardly.

2. A tape reel according to claim 1 wherein each of said fingers is offset axially inwardly with respect to the outer surface of said flange.

3. A tape reel according to claim 1, wherein each of said pairs of slits and the respective fingers interposed therebetween are formed in said flanges at substantially equal circumferential intervals, each of said intervals being greater than the width of said fingers, the fingers of each flange being staggered in relation to the fingers of the other flange so that each finger is disposed opposite the interval between adjacent fingers of the opposed flange.

4. A tape reel according to claim 1 in which each of said claws has an inner face projecting axially inwardly with respect to said reel in substantially aligned cooperating relation with and spaced radially outwardly from said axially outwardly offset shoulder portions of said flanges.

5. The combination of a tape reel according to claim 1 with a length of recording tape having a leader strip of greater width and stiffness than the recording tape attached thereto wherein the leader strip has an outer free end remote from said tape, said outer free end being progressively reduced in width.

6. The combination of a tape reel according to claim 1 with a length of recording tape having a leader strip of greater width and stiffness than the recording tape attached thereto wherein said leader strip has an inner end attached to said tape which inner end has an integral tongue-like projection of substantially the same width as the recording tape, tapering progressivly to a free end of reduced width, said tongue-like projection being bonded to an end of said tape.

7. A tape reel magazine adapted to store a tape reel of the type comprising a hub and substantially circular upper and lower flanges fixed to the opposite ends of said hub in substantially parallel and opposed relationship with each other, wherein said upper and lower flanges respectively have central portions surrounding said hub which define a space for receiving a tape-like recording medium, which said medium has a leader strip of greater width than said medium connected to one end thereof, said medium receiving space being wider than said medium but narrower than the width of said leader strip, said flanges having peripheral edge portions which define peripherally of said medium receiving space an annular leader strip receiving space at least substantially equal to the width of said leader strip, at least one of said flanges being formed with a plurality of pairs of spaced apart slits extending substantially radially inwardly from the peripheral edge thereof to form between each pair of slits and integrally with said flange a leader strip holding finger of reduced thickness in relation to other portions of the flange and provided at its outer free end with a claw projecting toward the opposite flange for holding the leader strip in said leader strip receiving space, said tape magazine being adapted to store such a tape reel in such a manner that the leader strip and the tape-like recording medium wound thereon may be unwound from or rewound upon said reel and characterized in that said tape magazine comprises a case defining therein a space for storing said tape reel, and having an opening for passing said leader strip and recording medium therethrough into and out of said case, and an opening through which said tape reel in said case may be connected with a drive source, means being provided in said case for disengaging the leader strip from said leader strip holding fingers and guiding it toward said tape passage opening when said tape reel rotates in a tape unwinding direction, leader strip pusher means being provided in said case for pressing said leader strip into said leader strip receiving space when said tape reel rotates in a winding direction, relievable brake means being provided in said case to prevent said tape reel from unnecessarily rotating in a tape unwinding direction; and means consisting of two cooperating members respectively provided between said tape reel and the inner wall of said case for regulating the position of the reel in said case by virtue of engagement of both members.

8. A tape magazine according to claim 7, in which said brake means comprises a movable engaging member for braking the tape reel by engagement with the peripheral edge of at least one of the flanges of said reel, means for urging said engaging member in a direction to engage the peripheral edge of said flange, and a brake relieving member arranged in such a position that it will cause said engaging member to make a pivotal movement against said biasing force and shift the same to a position not engageable with the peripheral edge of said flange when it is pushed by a brake relieving pin inserted exteriorly into the magazine, and will be in contact with only the side surface of said brake relieving pin while said pin is being held in its fully inserted position.

9. A tape magazine according to claim 7, in which said brake means comprises a movable engaging member for braking the tape reel by engagement with the peripheral edge of at least one of the flanges of said reel, means for urging said engaging member in a direction to engage the peripheral edge of said flange, and a brake relieving member arranged in such a position that it will cause said engaging member to make a pivotal movement against said biasing force and shift the same to a position not engageable with the peripheral edge of said flange when it is pushed by a brake relieving pin inserted exteriorly into the magazine, said engaging member having a leader tape stopper lug for preventing the forward end of said leader tape from riding onto said engaging member.

10. A tape magazine according to claim 7, in which said case consists of upper and lower case members separated from each other at a plane parallel to the flanges of said tape reel stored therein, and is provided with said leader tape disengaging means, said leader tape pusher means and said brake means, all of which are fixed to only one of said upper and lower case members.

11. A tape magazine according to claim 7, in which the trailing end portion of said recording medium having said leader tape connected thereto is disengageably wound around the hub of said reel.

12. A tape magazine according to claim 7, in which said reel position regulating means has a depression formed centrally of the reel and an engaging projection formed on the inner surface of said case at a location corresponding to said depression, and the height of said engaging projection is made larger than the total clearance between the inner surface of the case and the outer surfaces of the reel flanges.

* * * * *